Figure 1:
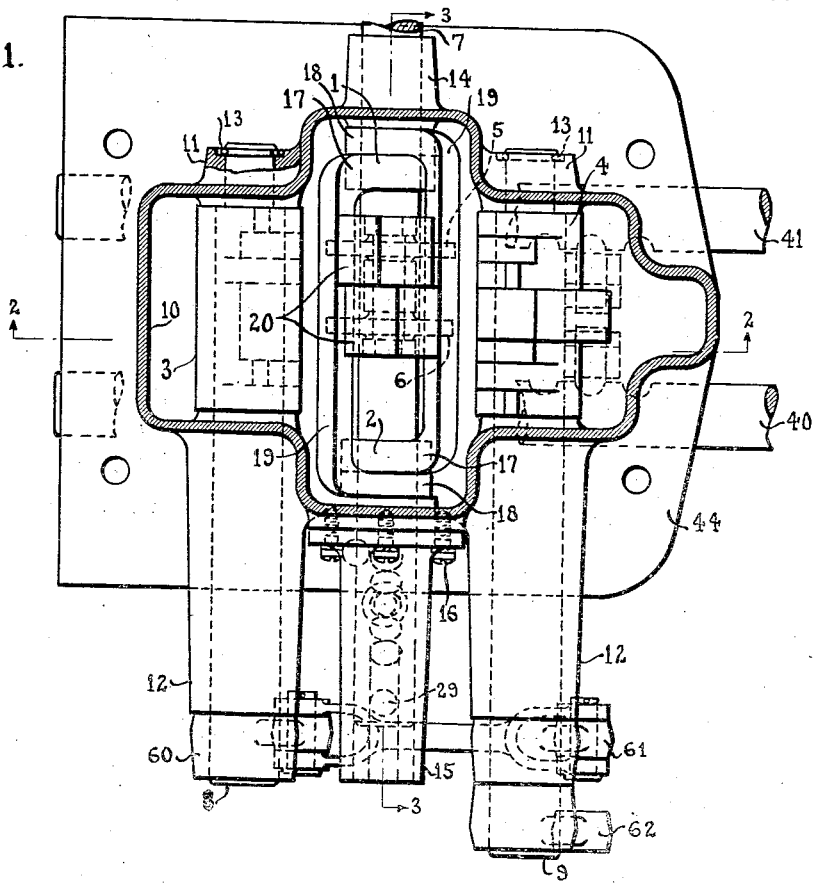

Aug. 28, 1928.

W. C. STEVENS ET AL 1,682,024

GEAR SHIFTING MECHANISM

Original Filed Dec. 17, 1921   3 Sheets-Sheet 1

INVENTOR.
William C. Stevens
Herman G. Taylor
BY
ATTORNEY

Aug. 28, 1928.
W. C. STEVENS ET AL
1,682,024
GEAR SHIFTING MECHANISM
Original Filed Dec. 17, 1921  3 Sheets-Sheet 2
Fig. 3.
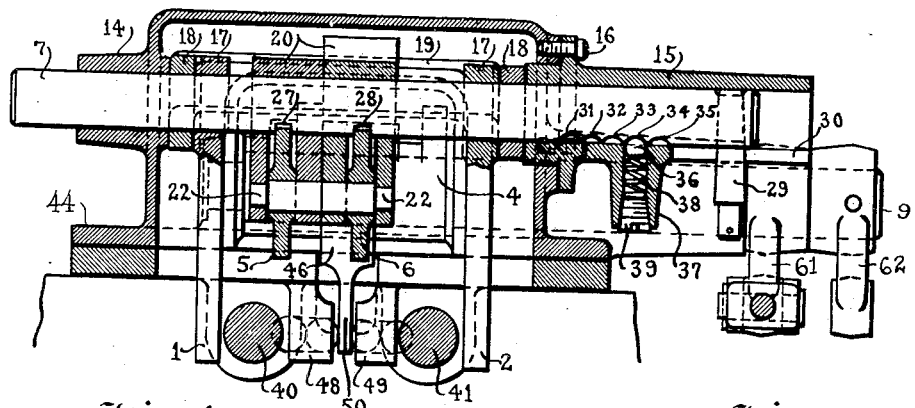
Fig. 4.
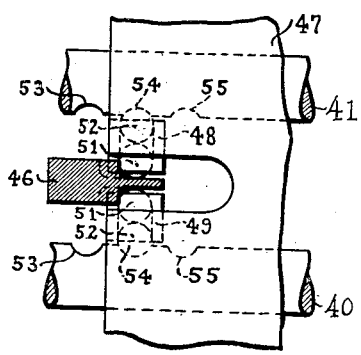
Fig. 15.
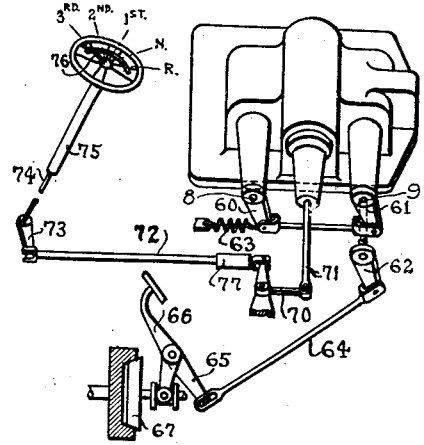
Fig. 16.
INVENTOR.
William C. Stevens
Herman J. Taylor
BY Frank H. Hubbard
ATTORNEY Aug. 28, 1928.
W. C. STEVENS ET AL
1,682,024
GEAR SHIFTING MECHANISM
Original Filed Dec. 17, 1921    3 Sheets-Sheet 3
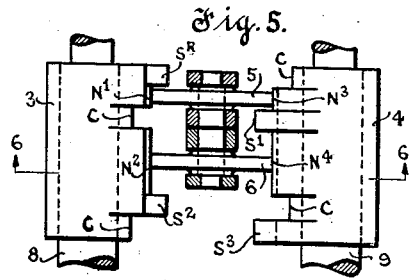
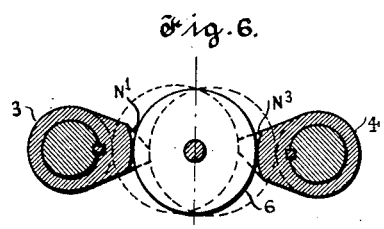
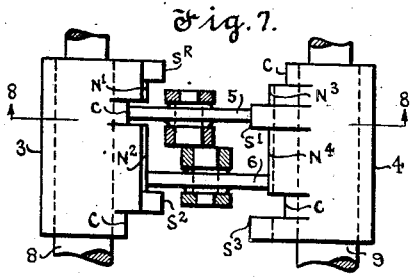
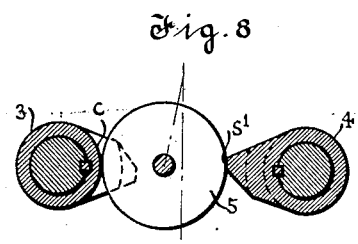
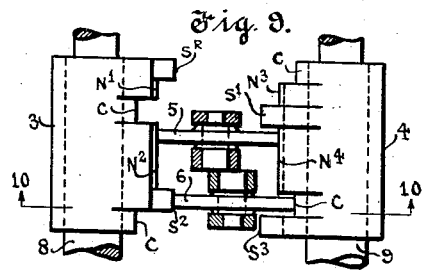
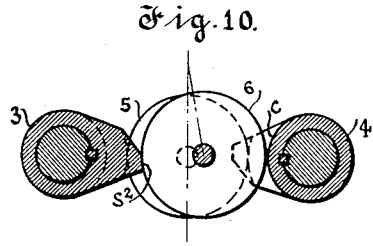
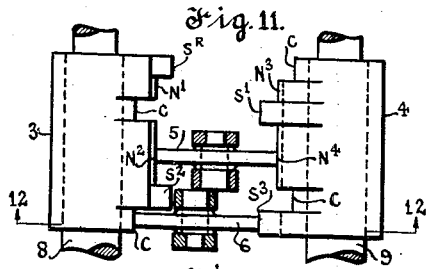
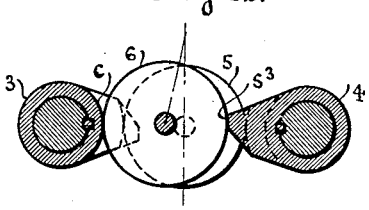
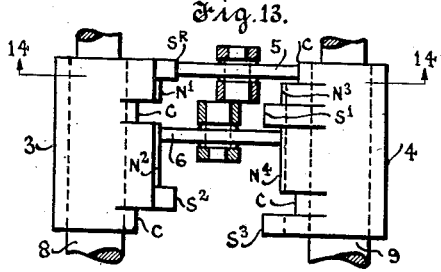
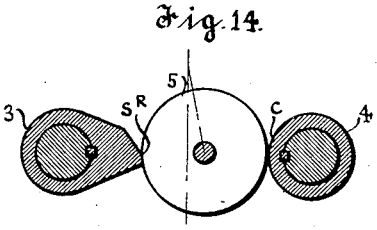
INVENTOR.
William C. Stevens
Herman J. Taylor
BY
ATTORNEY Patented Aug. 28, 1928.

1,682,024

UNITED STATES PATENT OFFICE.

WILLIAM C. STEVENS AND HERMAN J. TAYLOR, OF MILWAUKEE, WISCONSIN, ASSIGNORS, BY MESNE ASSIGNMENTS, TO VULCAN MOTOR DEVICES COMPANY, A CORPORATION OF PENNSYLVANIA.

GEAR-SHIFTING MECHANISM.

Continuation of application Serial No. 522,997, filed December 17, 1921. This application filed September 22, 1922. Serial No. 589,886.

This invention relates to gear shifting mechanisms particularly adapted for automobiles by means of which gear changes may be effected through operation of the automobile clutch lever or other suitable member following setting of a suitable speed selector.

The present application is a continuation of the application of William C. Stevens and Herman J. Taylor, Serial No. 522,997, filed December 17, 1921, and includes all common subject matter.

It has been proposed to shift gears by means of oscillatable cams actuated by the automobile clutch lever but heretofore such cams were arranged to coact with yokes carried by sliding gear shifting members and were adjustable axially for selection of the shifting operations. It has been found that the space required for adjustment of the cams renders such devices objectionable and it has also been found that during shifting operations the slidable gear shifting members tend to bind in their bearings under the action of the cams with a resultant increase in the manual effort required to effect gear shifting operations.

The present invention has among its objects to provide a simple, rugged and durable cam operated gear shifting mechanism which will overcome the aforesaid objections.

Another object is to provide a cam operated gear shifting mechanism having operating cams which are fixed against axial movement and selector parts which are movable axially with respect to the cams.

Another object is to provide a cam operated gear shifting mechanism including means for positively locking the gears in their neutral and shifted positions.

Another object is to minimize the overhead space required by the gear shifting mechanism.

Another object is to provide a cam operated gear shifting mechanism having oscillatable cams and oscillatable members actuated thereby to effect shifting operations.

Another object is to provide a cam actuated gear shifting mechanism wherein the selector parts are normally out of engagement with the operating cams thus enabling preselection of the speed changes.

Another object is to provide improved mechanism for effecting selection of the speed changes at any time.

Another object is to provide a purely mechanical gear shifting mechanism wherein the cam members and gear shifting members are all oscillatably mounted within an enclosing casing and are adapted to be lubricated by grease splashed thereon from the transmission gearing.

Another object is to provide a mechanical gear shifting mechanism having oscillatable gear shifting members the length of which can be varied to compensate for varying widths of gears and throw thereof.

Various other objects and advantages of the invention will hereinafter appear.

The accompanying drawings illustrate an embodiment of the invention which will now be described, it being understood that the embodiment illustrated is susceptible of modification without departing from the scope of the appended claims.

Figure 2:
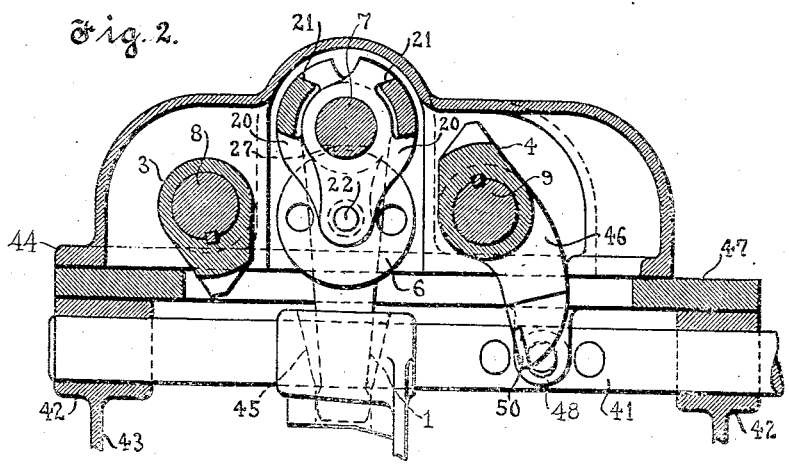

In the drawing,

Figure 1 is a top plan view of a gear shifting mechanism embodying the invention, the upper part of the enclosing casing being broken away and shown in section;

Figs. 2 and 3 are vertical sectional views taken on lines 2—2 and 3—3 of Fig. 1;

Fig. 4 is a fragmentary sectional view of certain of the parts shown in Figs. 1 and 2;

Figs. 5 to 14 inclusive are detail views of certain of the parts shown in Fig. 1, illustrating the coaction thereof;

Fig. 15 is a schematic view of the gear shifting mechanism illustrating the same in connection with an automobile clutch lever and a conventional type of selector device; and Fig. 16 is a detail sectional view of a spring connection shown in Fig. 15.

Referring to Figs. 1 to 3 inclusive the gear shifting mechanism illustrated includes oscillatable gear shifting levers 1 and 2, oscillatable cam elements 3 and 4 arranged on opposite sides of said levers and selector means including rollers 5 and 6 associated with said levers respectively and adapted to be actuated by said cam elements. As hereinafter set forth cam elements 3 and 4 are each provided with a plurality of cam surfaces, certain of said surfaces being adapted to engage rollers 5 and 6 in given settings thereof to effect selected shifting operations of levers 1 and 2 and certain others being adapted in given settings of said rollers to effect neutralization of said levers. The gear shifting mechanism illustrated is designed for a three speed and reverse automobile gear set, the lever 1 being movable in opposite directions from an intermediate neutral position to effect reverse and first speed gear shifting operations and the lever 2 being movable in opposite directions from an intermediate neutral position to effect second and third speed gear shifting operations.

Levers 1 and 2 are oscillatably mounted upon a shaft 7 while cam elements 3 and 4 are keyed to oscillatable shafts 8 and 9 respectively, said shafts being arranged in a substantially parallel relation and being supported at opposite ends in bearings in the front and rear walls of an inverted box shaped casing 10. As best shown in Fig. 1 the shafts 8 and 9 are supported at opposite ends in bearings 11—11 on the rear wall of casing 10 and bearings 12—12 on the front wall of said casing and said shafts are recessed adjacent their inner ends to receive circular spring clips 13 which engage bearings 11 to lock said shafts in place. Shaft 7 is supported in the rear wall of casing 10 by a bearing 14 and in the front wall thereof by a bearing bracket 15 fixed to said casing by screws 16.

Shift levers 1 and 2 are of like construction each of the same being provided with a bearing portion 17 at the upper end thereof and a bearing portion 18 spaced with respect to said former bearing portion and connected thereto by an offset extension 19. Levers 1 and 2 are arranged so that the extensions 19 thereof are disposed on opposite sides of the axis of shaft 7 and each of the rollers 5 and 6 is operably connected to the extension 19 of its respective shift lever by a lever 20 rotatably mounted on shaft 7. Levers 20 are of like construction each having a hub portion provided with a recess 21 and a downwardly extending bifurcated portion for receiving its respective roller. Each of the rollers 5 and 6 is rotatably secured to the lower end of its respective lever 20 by a pin 22 and the lever 20 associated with roller 5 is arranged to receive extension 19 of lever 1 while the lever 20 associated with roller 6 is arranged to receive extension 19 of lever 2. Rollers 5 and 6 are thus fixed against rotation with respect to their associated shift levers but are adjustable axially with respect to cam elements 3 and 4.

As best shown in Figs. 2 and 3 rollers 5 and 6 project into recesses 27 and 28 respectively in the underside of shaft 7 and said shaft is shiftable axially within bearings 14 and 15 to move said rollers into different operative positions with respect to cam elements 3 and 4. Shaft 7 has a downwardly extending operating pin 29 fixed thereto which extends through a slot 30 in the under side of bearing bracket 15 and said shaft is also provided with means for restraining the same in positions corresponding to given settings of rollers 5 and 6. Said restraining means comprises a series of notches 31 to 35 inclusive on the under side of said shaft which are adapted to receive a spring pressed ball 36. As best shown in Fig. 3 ball 36 is slidable within an opening in a downwardly extending projection 37 on the underside of bearing bracket 15 and the same is pressed upwardly by spring 38 held within said opening by a threaded plug 39.

As before stated cam elements 3 and 4 are each provided with a plurality of cam surfaces certain ones being adapted to engage rollers 5 and 6 in given settings thereof to effect selected shifting operations of levers 1 and 2 and certain others being adapted in given settings of said rollers to effect neutralization of said levers. All of the neutralizing cam surfaces of elements 3 and 4 are of like contour and the same will be hereinafter referred to by reference character N while all of the shifting cam surfaces are also of like contour and will be hereinafter referred to by reference character S. Each of the cam elements 3 and 4 is also provided with surfaces C concentric to the axis thereof, the circular surfaces on each of said elements being arranged opposite the shifting surfaces on the other of said elements to prevent overthrow of the shift levers during shifting operations.

The arrangement of the surfaces on cam elements 3 and 4 and the coaction thereof with rollers 5 and 6 will now be more fully set forth in connection with figures 5 to 14 inclusive. As shown in certain of these figures cam element 3 is provided with shifting surfaces $S^R$ and $S^2$, neutralizing surfaces $N'$ and $N^2$ and two circular surfaces C, while cam element 4 is provided with shifting surfaces $S'$ and $S^3$ neutralizing surfaces $N^3$ and $N^4$ and two circular surfaces C. All of the shifting surfaces S, neutralizing surfaces $N'$ and $N^3$ and circular surfaces C are of a unit width while the width of neutralizing surfaces $N^2$ and $N^4$ is substantially three times such unit width. The width of rollers 5 and 6 is slightly less than the unit width of the aforesaid surfaces and the center to center spacing of said rollers corresponds to substantially three times the unit width of such surfaces. Cam elements 3 and 4 are movable simultaneously in a counterclockwise direction from the positions shown in Fig. 2 and upon movement of said elements through an angle of substantially 40° from such positions neutralizing surfaces N' and N² are adapted to move rollers 5 and 6 and their associated shift levers from their left hand gear shifting positions into neutral while neutralizing surfaces N³ and N⁴ are adapted to move said rollers and shift levers from their right hand gear shifting positions into neutral. Upon movement of cam elements 3 and 4 through an angle of substantially 60° from the positions shown in Fig. 1 shifting surfaces $S^R$ and $S^2$ are adapted to move rollers 5 and 6 and their associated shift levers from their extreme left hand positions into their extreme right hand positions, while shifting surfaces S' and S³ are adapted to move said rollers and levers from their extreme right hand positions into their extreme left hand positions. Said shifting surfaces are also so designed that with rollers 5 and 6 in neutral said surfaces will engage the same only after substantially 45° of movement from the positions shown in Fig. 2.

Assuming now that shaft 7 is positioned so that ball 36 engages notch 34, rollers 5 and 6 will then be positioned as shown in Fig. 5. In such position neutralizing surfaces N' and N³ are located on opposite sides of roller 5 while neutralizing surfaces N² and N⁴ are located on opposite sides of roller 6. Thus during movement of cam elements 3 and 4 to the position shown in Fig. 6, said neutralizing surfaces will serve to move either of said rollers and its associated shift lever from either of the shifted positions shown in dotted lines to the neutral position shown in full lines. Upon setting of shaft 7 in a position wherein ball 36 engages notch 33 roller 5 is located to the left of shifting surface S' while roller 6 is located between neutralizing surfaces N² and N⁴, as shown in Fig. 7. Shifting surface S' is then adapted to act on roller 5 to move the same and its associated lever 1 towards the left into the first speed position as shown in Fig. 8 while neutralizing surfaces N² and N⁴ are then adapted to act on roller 6 to effect neutralization of lever 2 if the same is in either of its shifted positions. Upon setting of shaft 7 in a position wherein ball 36 engages notch 32 roller 6 is located to the right of shifting surface S² while roller 5 is located between neutralizing surfaces N² and N⁴ as shown in Fig. 9. Shifting surface S² is then adapted to act on roller 6 to move the same and its associated lever 2 towards the right into the second speed position as shown in Fig. 10 while neutralizing surfaces N² and N⁴ are then adapted to act on roller 5 to effect neutralization of lever 1 if the same is in either of its shifted positions. Upon setting of shaft 7 in a position wherein ball 36 engages notch 31 roller 6 is located to the left of shifting surface S³ while roller 5 is located between neutralizing surfaces N² and N⁴ as shown in Fig. 11. Shifting surface S³ is then adapted to act on roller 6 to move the same and its associated shift lever 2 into the third speed position as shown in Fig. 12 while neutralizing surfaces N² and N⁴ are then adapted to act on roller 5 to effect neutralization of lever 1 if the same is in either of its shifted positions. Upon setting of shaft 7 in a position wherein ball 36 engages notch 35 roller 5 is located to the left of shifting surface $S^R$ and roller 6 is located between neutralizing surfaces N² and N⁴, as shown in Fig. 13. Shifting surface $S^R$ is then adapted to act on roller 5 to move the same and its associated shift lever 1 into reverse position as shown in Fig. 14 while neutralizing surfaces N² and N⁴ are then adapted to act on roller 6 to effect neutralization of lever 2 if the same is in either of its shifted positions.

From the foregoing it is apparent that when cam elements 3 and 4 are in their normal position rollers 5 and 6 can be readily set in any of the aforedescribed positions for preselection of the shifting operations. Further it should be noted that when either of the shifting levers is moved to a selected position the same will remain therein regardless of subsequent operation of cam elements 3 and 4 pending further operation of the selector mechanism.

The aforedescribed gear shifting mechanism is capable of use in connection with various types of gear sets but for the purpose of illustration the same is shown in connection with a gear set including shifter rods 40 and 41 slidably mounted within bearings 42 in a casing 43, said rods each having a gear shifting fork secured thereto, the hub portion of one of said forks being shown in Fig. 2. Casing 10 of the gear shifting mechanism is provided with a projecting flange 44 for securement to casing 43 and the lower ends of the shift levers 1 and 2 are each provided with an enlarged portion adapted to fit within a recess 45 in the hub of its associated shifter fork. It is apparent that by varying the length of levers 1 and 2 different degrees of throw can be obtained to suit gears of different width and throw. It is desirable to provide gear sets of the aforesaid character with means for retaining the shifter rods in their neutral and shifted positions and the gear shifting mechanism illustrated includes means for positively locking the shifter rods in such positions. As best shown in Figs. 2 and 4 the locking means illustrated includes a downwardly extending arm 46 fixed to cam element 4, said arm being adapted to cooperate with locking parts which for convenience are shown as supported by a plate 47 between the upper surface of the gear set casing 43 and flange 44 of casing 10 but which if desired may be a part of the gear set casing. Plate 47 is provided with downwardly projecting lugs 48 and 49 located between the shifter rods 40 and 41 and on opposite sides of arm 46. The lower portion of arm 46 projects between lugs 48 and 49, said portion being of reduced thickness and being provided with a knife edge 50 on the left hand side thereof as shown in Fig. 2. Lugs 48 and 49 are each provided with a drilled opening for receiving a pair of balls 51 and 52 the outer balls 52 in each of said lugs being adapted to co-operate with locking notches provided in the adjacent shifter rods. As best shown in Fig. 4 shifter rods 40 and 41 are each provided with notches 53, 54 and 55, the first notch for one extreme position, the second for neutral position and the third for the opposite extreme position.

As shown in Fig. 2 with cam elements 3 and 4 in normal position the lower portion of arm 46 is located between the balls 51 on opposite sides thereof and serves to hold the outer balls 52 in engagement with the adjacent notches in the shifter rods to positively lock the latter against movement. However, during initial movement of the cam elements 3 and 4, arm 46 moves out of engagement with balls 51 to permit balls 52 to move inwardly during shifting operations.

Cam shafts 8 and 9 can be operatively connected to the automobile clutch lever in numerous ways and any suitable type of selector mechanism can be provided for shifting shaft 7 axially for selection of the gear shifting operations. In the embodiment shown in Fig. 15 shaft 8 has a downwardly projecting lever 60 fixed thereto while shaft 9 has downwardly projecting levers 61 and 62 fixed thereto. Levers 60 and 61 are connected by a link and are biased by a spring 63 in a direction to return cam elements 3 and 4 to the normal position shown in Fig. 2. Lever 62 is connected by a link 64 to a downwardly projecting arm 65 on a clutch lever 66, said clutch lever being movable in a counterclockwise direction to release an automobile clutch shown at 67. Link 64 has a lost motion connection with arm 65 of clutch lever 66 said connection permitting depression of said clutch lever to a degree sufficient to release clutch 67 without actuation of the cam elements 3 and 4. Thus provision is made for insuring against actuation of the shifting mechanism except upon release of clutch 67 and for also insuring return of the shifting mechanism to normal position under the action of spring 63 upon release of said clutch.

Selector shaft 7 has its operating pin 29 connected to one arm of a bell crank lever 70 by a link 71 and the opposite arm of said bell crank lever is connected by a link 72 to an arm 73 fixed to the lower end of a shaft 74. Shaft 74 extends upwardly through the usual steering column 75 and has a selector lever 76 fixed to the upper end thereof which is movable to the positions indicated for setting of the selector parts in the positions hereinbefore described.

In practice it has been found that unskilled operators sometimes attempt to actuate the selector parts while maintaining the clutch lever 66 depressed to an extent whereby the cam projections on elements 3 and 4 interfere with the axial shifting of rollers 5 and 6. In such instances the selector mechanism is likely to be subjected to strains which are objectionable and to insure against such strains a resilient connection 77 is included in the link connection 72. As shown in Fig. 16, the resilient connection 77 includes collars 78 and 79 slidably mounted on a reduced portion 80 on the right hand end of link 72, the left hand collar 78 being adapted to abut a shoulder 81 on link 72 and the right hand collar 79 being adapted to abut a nut 82 threaded on the portion 80. A spring 83 is held under compression between collars 78 and 79 and is enclosed by a tubular member 84 having an inturned portion 85 on the left hand end thereof to abut collar 78. The right hand end of tubular member 84 is internally threaded to receive a bushing 86, the left hand end of said bushing being adapted to abut collar 79 and the right hand end thereof being provided with a yoke 87 to be pivotally connected to bell crank lever 70.

With the resilient connection above described it is apparent that if the selector parts are locked against axial movement, movement of the link 72 towards the left merely causes collar 78 to compress spring 83 against collar 79, while movement of link 72 towards the right causes collar 79 to compress said spring against collar 78. Thus it is apparent that by properly proportioning spring 83 undue strains on the operating mechanism can be eliminated, while under ordinary conditions the resilient connection will remain inactive. Further it should be noted that even though the cam elements interfere with axial shifting of rollers 5 and 6 the spring 83 permits movement of selector lever 76 into any of its several positions at all times and insures movement of said rollers into a selected position upon return of the cam elements into normal position.

In the operating mechanism above described a lost motion connection is provided for insuring release of the clutch prior to actuation of the cam elements, but it should be noted that if desired such connection can be eliminated by increasing the idle movement of the cam elements 3 and 4. Also it should be noted that if desired shafts 8 and 9 of the cam elements can be connected by gearing and can be actuated from the clutch lever by gearing.

What we claim as new and desire to secure by Letters Patent is:

1. In a gear shifting device, in combination, spaced elements, each of varying contour and a part located between said elements and cooperable with surfaces of said elements selectively to effect gear changes for different speed settings.

2. In a gear shifting device, in combination, spaced cam elements and a part located between said elements and cooperable with surfaces of said elements selectively to effect gear changes for different speed settings, said part being also cooperable with surfaces of said elements to effect gear neutralizing.

3. In a gear shifting device, in combination, spaced cam elements and a part located between said elements and forming therewith a gear shifting medium, said part being cooperable with surfaces of said elements alternatively for effecting different speed settings and being also cooperable with each of said elements for effecting gear neutralizing.

4. In a gear shifting device, in combination, spaced cam elements and an interposed part jointly forming a gear shifting medium, said cam elements and said part being relatively adjustable for coaction between said part and different surfaces of said elements and said part being cooperable with said cam elements selectively for both shifting and neutralizing.

5. In a gear shifting device, in combination, a plurality of cam elements arranged in a spaced relation and means located between said cam elements to be actuated by one of said elements for effecting certain of a plurality of gear changes and to be actuated by another of said elements for effecting other of such gear changes.

6. In a gear shifting device, in combination, a plurality of cam elements arranged in a spaced relation and means located between said cam elements to be actuated by one of said elements for effecting certain of a plurality of gear changes and to be actuated by another of said elements for effecting other of such gear changes, said means being also operable by said cam elements to effect prior to shifting of any gears neutralization of any gears then in mesh.

7. In a gear shifting device, in combination oscillatable cam elements arranged in an opposed relation and interposed coacting members arranged in a definitely spaced relation, said elements and coacting members being relatively adjustable longitudinally of the former whereby said coacting members will coact with said cam elements selectively for gear shifting and also for neutralizing.

8. In a gear shifting device, in combination, a plurality of opposed oscillatable elements and a plurality of coacting members arranged therebetween in a definitely spaced relation longitudinally of the former, said elements being fixed against longitudinal movement and said members being adjustable longitudinally of said elements and being adapted to coact therewith in different positions to effect a plurality of gear changes selectively.

9. In a gear shifting device, in combination, a plurality of opposed oscillatable elements and a plurality of coacting members arranged therebetween in a definitely spaced relation, longtudinally of the former, said members being adjustable axially of said elements and being adapted in different positions to coact therewith to effect a plurality of gear changes selectively and also to effect neutralization of all gears or such gears as may be in mesh prior to shifting of any other gears.

10. In a gear shifting mechanism, in combination, a pair of cam elements arranged in a spaced relation and a plurality of coacting members arranged therebetween in a definitely spaced relation longitudinally of the former, said cam elements and coacting members being relatively adjustable longitudinally of the former into different relations for effecting neutralization of the controlled gears and shifting operations thereof selectively and said coacting members being individually used for a number of different shifting operations and spaced to minimize the length of said cam elements required for the desired number and sequence of shifting and neutralizing operations.

11. In a gear shifting device, in combination, a plurality of opposed oscillatable elements, said elements being fixed against axial movement and a plurality of coacting members arranged therebetween and adjustable longitudinally with respect to said elements, said members being adapted in different positions located within the longitudinal space occupied by said elements to coact therewith to effect a plurality of gear changes selectively or neutralization of all controlled gears.

12. In a gear shifting device, in combination, a plurality of oscillatable cam elements having their axes arranged in a substantially parallel relation and each having a series of radial cam projections thereon and a plurality of oscillatable parts arranged therebetween in a definitely spaced relation longitudinally of the former, said parts being adjustable longitudinally with respect to said cam elements and being adapted in given settings to coact with certain of the cam projections of said elements to effect a plurality of gear changes selectively and in another setting to coact with certain other of the cam projections of said elements to effect neutralization of all of the controlled gears.

13. In a gear shifting device, in combination, a plurality of oscillatable cam elements each having a series of cam projections thereon and means located between said cam elements and operable by certain of the cam projections of each to effect a plurality of gear changes selectively and by certain other of the cam projections of said elements to effect neutralization of all of the controlled gears, said cam elements also having surfaces thereon to coact with said means to prevent overthrow of the controlled gears beyond their shifted positions.

14. The combination with a sliding gear transmission having shiftable gears for establishing a plurality of driving relations and a slide operatively connected to each of the shiftable gears, of oscillatable elements for actuating said slides, said elements being fixed against axial movement and each having a plurality of cam projections thereon and means forming therewith a gear shifting medium, said means being operatively connected to said slides and including parts adjustable longitudinally with respect to said elements, said parts being operable by certain of the projections of said elements to effect a plurality of gear changes selectively.

15. In a gear shifting device, in combination, a gear shifting member having extreme gear shifting positions and an intermediate neutral position and cam elements disposed on opposite sides of said member to effect movements thereof in reverse directions respectively, each of said elements having surfaces thereon for selectively moving said member from one extreme position to its other extreme position or from the former extreme position into neutral.

16. In a gear shifting device, in combination, a member having extreme gear shifting positions and an intermediate neutral position and cam elements disposed on opposite sides of said member to effect movements thereof in reverse directions respectively, each of said elements having surfaces thereon for selectively moving said member from one extreme position to the other extreme position or from the former extreme position into neutral, each of said elements also having surfaces thereon for preventing overthrow of the gear shifting member by the other of said elements.

17. In a gear shifting device, in combination, a plurality of gear shifting members each having extreme gear shifting positions and an intermediate neutral position, oscillatable cam elements disposed on opposite sides of said members to effect movements thereof in reverse directions respectively, each of said elements being provided with cam surfaces for selectively moving said members from one extreme position to the other extreme position and other surfaces for selectively moving said members from the former extreme position into neutral.

18. In a gear shifting device, in combination, a plurality of oscillatable gear shifting members each having extreme gear shifting positions and an intermediate neutral position, oscillatable cam elements disposed on opposite sides of said members to effect movements thereof in reverse directions respectively and a part associated with each of said members to coact with said cam elements, said parts being adjustable longitudinally with respect to said cam elements, and each of said elements being adapted upon given settings of said parts to selectively move said members from one extreme position to the other extreme position and to also move said members from the former extreme position into neutral.

19. In a gear shifting device, in combination, gear shifting members each having extreme gear shifting positions and an intermediate neutral position, a part operatively connected to each of said members and adjustable with respect thereto and parts located on opposite sides of said former parts and having surfaces thereon adapted to co-operate with said former parts in given settings thereof to effect a plurality of shifting operations of said members selectively and to also effect neutralization of said members.

20. In a gear shifting device, in combination, oscillatable gear shifting members each having extreme gear shifting positions and an intermediate neutral position, a part operatively connected to each of said members and adjustable axially with respect thereto and parts located on opposite sides of said former parts and having surfaces thereon adapted to co-operate therewith in given settings thereof to effect a plurality of shifting operations of said members selectively and to also effect neutralization of said members.

21. In a gear shifting device, in combination, gear shifting members each having extreme gear shifting positions and an intermediate neutral position, a part operatively connected to each of said members and adjustable at right angles to the plane of movement thereof, and oscillatable cam sets disposed on opposite sides of said parts and having surfaces thereon adapted to coact therewith upon given settings thereof to effect a plurality of shifting operations of said members selectively and to also effect neutralization of said members.

22. In a gear shifting device, in combination, oscillatable gear shifting members each having extreme gear shifting positions and an intermediate neutral position, a selector part operatively connected to each of said members and adjustable axially with respect thereto, and a pair of oscillatable cam elements arranged on opposite sides of said members and having cam surfaces thereon adapted to coact with said parts in given settings thereof to effect a plurality of gear shifting operations of said members selectively.

23. In a gear shifting device, in combination, a pair of oscillatable gear shifting members each having extreme gear shifting positions and an intermediate neutral position, a selector part operatively connected to each of said members and adjustable axially with respect thereto, and a pair of oscillatable cam elements arranged on opposite sides of said members and having cam surfaces thereon adapted to coact with said parts in given settings thereof to effect a plurality of gear shifting operations of said members selectively, said cam elements also having surfaces thereon adapted to coact with said parts in such given settings to effect neutralization of both or either member upon shifting of the other.

24. In a gear shifting device in combination oscillatable gear shifting members each having extreme gear shifting positions and an intermediate neutral position, a selector part associated with each of said members, said parts being fixed to move angularly with their respective members about the axis thereof and being adjustable in the direction of the axis of their respective members and a pair of oscillatable cam elements disposed on opposite sides of said members with their axes substantially parallel to the axes of said members, said elements having cam surfaces thereon adapted to coact with said parts in given settings thereof to effect given shifting operations of said members selectively or neutralization of said members.

25. In a gear shifting device in combination vertically arranged gear shifting members having extreme gear shifting positions and an intermediate neutral position, said members being oscillatable about a common axis located at the upper ends thereof, oscillatable cam elements arranged on opposite sides of said members with their axes below the axis of said members and substantially parallel thereto and a part associated with each of said members and operable by said cam elements to effect shifting and neutralizing operations of said members, said parts being fixed to move angularly with their respective gear shifting members about the axis thereof and being adjustable in the direction of the axis of said members for selection of the shifting and neutralizing operations.

26. In a gear shifting device in combination oscillatable gear shifting members each having extreme gear shifting positions and an intermediate neutral position, a common supporting shaft for said members adjustable axially with respect thereto, oscillatable cam elements arranged on opposite sides of said members and a selector part associated with each of said gear shifting members, said parts being fixed to move angularly with their respective members about the axis thereof and being movable with said shaft upon axial adjustment of the latter into different operative positions with respect to said cam elements for selection of the shifting and neutralizing operations of said members.

27. In a gear shifting device in combination a plurality of cam elements arranged in a spaced relation and each having a plurality of cam projections thereon a plurality of oscillatable gear shifting members arranged between said elements a common supporting shaft for said members adjustable axially with respect thereto and selector parts associated with each of said members and movable with said shaft upon axial adjustment thereof into different operative positions with respect to said cam elements for selection of the shifting and neutralizing operations.

28. In a control mechanism for speed change gears in combination oscillatable gear shifting members having neutral and operative positions, means including a plurality of cam elements disposed on opposite sides of said members for effecting shifting and neutralizing operations of said members selectively, means for locking said members in their neutral and operative positions and means associated with said cam elements for releasing said locking means for shifting and neutralizing operations of said members.

29. In a control mechanism for speed change gears in combination oscillatable gear shifting members having neutral and operative positions, selective gear shifting means associated with said members including a plurality of cam elements each adapted to effect given shifting and neutralizing operations of said members and means for positively locking said gear shifting members in their neutral and operative positions said means including an actuating part associated with one of said cam elements.

30. The combination with a gear shifting device having opposed oscillatable cam elements and an interposed selector part adapted to be set in any one of a plurality of positions for selection of shifting and neutralizing operations, of an operating member for said part adapted to be set in given positions corresponding to the aforesaid positions of said part and operative connections between said part and said member including a single helical spring compressible axially to permit setting of said member in any of its operative positions while said selector part is restrained in any of its shifting or neutralizing positions, said spring being adapted upon release of said selector part to move the same to a position corresponding to the position of said member.

In witness whereof, we have hereunto subscribed our names.

WILLIAM C. STEVENS.
HERMAN J. TAYLOR.